(12) United States Patent
Horton

(10) Patent No.: US 6,987,736 B1
(45) Date of Patent: Jan. 17, 2006

(54) ROUTER POLLING SYSTEM AND METHOD

(75) Inventor: John J. Horton, Canton, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 816 days.

(21) Appl. No.: 09/665,582

(22) Filed: Sep. 18, 2000

(51) Int. Cl.
*G01R 31/08* (2006.01)
*H04L 12/28* (2006.01)
*H04L 12/66* (2006.01)
*H04M 1/24* (2006.01)

(52) U.S. Cl. ............... 370/248; 370/400; 370/352; 370/250; 379/16; 379/27.01; 379/10.01

(58) Field of Classification Search ............ 709/225, 709/227, 228, 229, 245, 208, 209, 200, 224, 709/237; 370/352, 350, 400, 431, 432, 433, 370/449, 450, 241, 242–248, 218, 216, 217, 370/252, 233, 468, 395.4, 392, 389; 711/110, 711/119; 379/10.01, 22.03, 93.11, 142.14
See application file for complete search history.

(56) References Cited

U.S. PATENT DOCUMENTS

| | | | | |
|---|---|---|---|---|
| 5,835,721 A | * | 11/1998 | Donahue et al. ............ 709/224 |
| 5,959,974 A | * | 9/1999 | Badt et al. .................... 370/233 |
| 5,964,837 A | * | 10/1999 | Chao et al. ................... 709/224 |
| 6,205,579 B1 | * | 3/2001 | Southgate ..................... 717/11 |
| 6,392,990 B1 | * | 5/2002 | Tosey et al. ................. 370/218 |
| 6,470,395 B1 | * | 10/2002 | Van Aken et al. ........... 709/245 |
| 6,557,038 B1 | * | 4/2003 | Becker et al. ............... 709/227 |
| 6,574,197 B1 | * | 6/2003 | Kanamaru et al. .......... 370/252 |
| 6,606,659 B1 | * | 8/2003 | Hegli et al. .................. 709/225 |
| 6,609,154 B1 | * | 8/2003 | Fuh et al. .................... 709/225 |
| 6,611,868 B1 | * | 8/2003 | Arutyunov ................... 709/200 |
| 6,622,179 B2 | * | 9/2003 | Welder ......................... 710/15 |
| 6,640,239 B1 | * | 10/2003 | Gidwani ...................... 709/203 |
| 6,654,914 B1 | * | 11/2003 | Kaffine et al. ................ 714/43 |
| 6,668,282 B1 | * | 12/2003 | Booth, III et al. ........... 709/224 |
| 6,747,957 B1 | * | 6/2004 | Pithawala et al. ........... 709/224 |

* cited by examiner

*Primary Examiner*—Hanh Nguyen
(74) *Attorney, Agent, or Firm*—Withers & Keys, LLC

(57) ABSTRACT

A system and method for maintaining network activity in a router to keep the router from entering a lock-up state due to inactivity. The system and method is operable to send a ping request via the router to an Internet Protocol (IP) address to which a response is expected. It is then determined whether the response is received. If no response is received, a notification message is displayed indicating that network access is unavailable. The process is preferably automatically repeated such that the network router does not experience a prolonged period of inactivity and the user is apprised of the status of his network connection.

32 Claims, 2 Drawing Sheets

ROUTER POLLING SYSTEM AND METHOD

BACKGROUND

1. Field of the Invention

The present invention is directed to electronic networks. More particularly, the present invention is directed to maintaining an Internet connection via a router even during periods of network traffic inactivity.

2. Background of the Invention

The Internet is fast becoming an essential tool for business. Large corporations and similar large entities that can afford it, have connectivity to the Internet via sophisticated networks including multiple hubs, servers and, in some cases, dedicated/leased high speed lines made available by local telecommunications providers. Additionally, entities that can afford it also have dedicated information technology (IT) departments that monitor, detect and correct (when possible) network outages.

Small businesses, on the other hand, typically do not have access to the high speed/bandwidth leased lines that larger companies often have access to. Instead, small businesses are becoming increasingly reliant on various forms of Digital Subscriber Line (DSL) services, collectively known as xDSL services, to access the Internet. xDSL service furnishes a small business access to the Internet at speeds which, while not necessarily as fast as leased lines, are nevertheless substantially faster than conventional dial-up modem technology.

A significant advantage to employing xDSL service is that one's Internet access is "always-on." This is in contrast to conventional dial-up modem access which requires a set-up procedure each time Internet access is desired.

Because xDSL access is presumably "always-on," not surprisingly, users expect this to be the case at all times. In reality, however, xDSL service may go down from time to time, which leads to periods of inactivity across the network. Periods of inactivity in a network can also be caused by overnight periods when, for example, small businesses are closed. Such periods of inactivity can lead to unforeseen consequences with respect to some network hardware components, and especially some models of network routers.

Specifically, the present inventor has observed that some router models will, after experiencing a period of inactivity, caused either by inactivity from a user's end and/or by a failure of a segment of the network on the "other side" of the router, i.e., the xDSL service, succumb to "lock-up" whereby even subsequent network activity will not re-activate the router. To end the lock-up situation, the power to the router might have to be cycled off and on.

Unfortunately, unlike a large corporation, a small business does not have the resources to employ a dedicated IT department. Thus, not only might personnel from a small business not know where their router might be located on their premises, but these people often do not even know that there is router on their premises. Accordingly, when it determined that Internet access is "down," a small business invariably calls its xDSL provider to notify the provider of the outage and request a service call, which in turn, requires that a technician be dispatched to the small business customer. These actions, and the time that the small business does not have Internet access lead to increased expense, inefficiencies and frustration for both the xDSL service provider and small business customer.

SUMMARY OF THE INVENTION

The present invention provides a method for maintaining activity (traffic) in a network, and in particular keeping a router in the network active to thereby keep the router from falling into a lock-up state. The present invention also preferably informs a user of the status of his Internet access. The foregoing is preferably accomplished by sending a request intended to pass through the router and to which a response is expected, and determining whether the response is received. If no response is received, a notification message is displayed to a user indicating that their Internet connection is "down." The step of sending a request is preferably automatically carried out on a periodic basis such that the router never experiences a relatively long period of inactivity. Thus, in accordance with the present invention, the router does not lock up as a result of periods of inactivity.

In a preferred embodiment of the present invention, the "request" that is sent is a "ping" request or command to a predetermined Internet Protocol (IP) address, though the IP address need not necessarily be accessible only via the Internet. Rather, in accordance with the principles of the present invention, the only requirement is that the IP address is one that will cause the request to pass through the router, thereby precluding the router from experiencing periods of inactivity.

Further in accordance with the present invention, software that causes the requests to be sent periodically is preferably operable at all times, i.e., is an active program running within a multi-tasking operating system such as Microsoft Windows 2000, UNIX or Linux.

Further still, the present invention is preferably in the form of computer software that is downloadable from an Internet web site. Alternatively, the present invention can be implemented in firmware that is delivered, for example, with an Internet-ready computer.

It is therefore an object of the present invention to provide a method for keeping a router operable in a network to preclude the router from experiencing prolonged periods of inactivity.

It is yet another object of the present invention to provide a method for notifying a user of the status of his Internet access.

It is another object of the present invention to provide a software application that continuously runs in the background of a multi-tasking operating system.

It is also an object of the present invention to provide a method for notifying a user that his Internet access has been restored.

These and other objects of the present invention will become apparent upon a reading of the following detailed description in conjunction with the accompanying drawings.

DETAILED DESCRIPTION OF THE INVENTION

Figure 1:
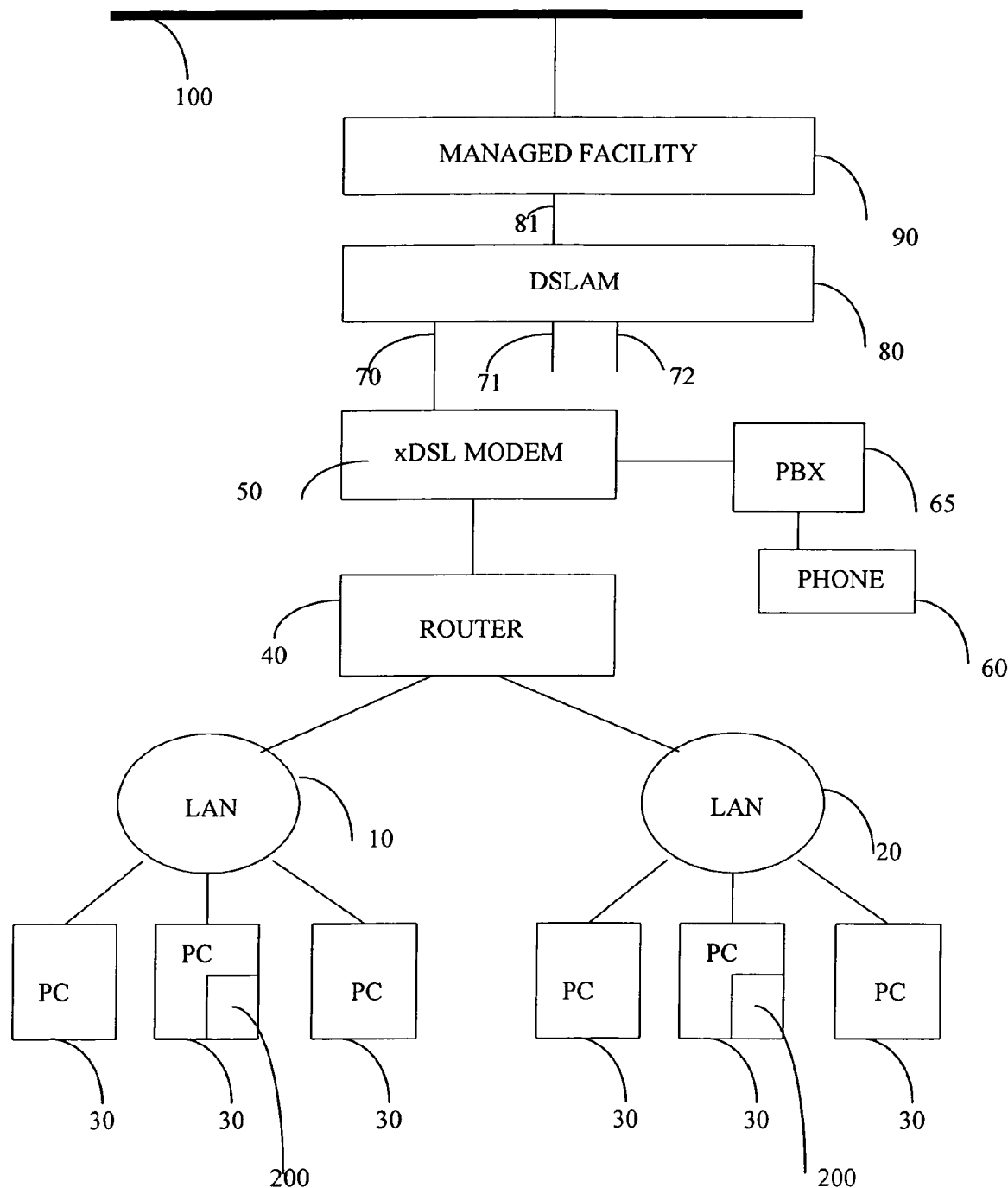
FIG. 1 is a schematic illustration of a network topology including the location of software for implementing the present invention.

FIG. 1 depicts a network topology for a small business including two local area networks (LANs) 10 and 20 each comprising several personal computers 30. LANs 10 and 20 are connected to each other via router 40 which, in turn, is connected to XDSL modem 50. One or more telephones 60 might be connected directly, or via private branch exchange (PBX) 65, to xDSL modem 50 by means well-known to those skilled in the art. xDSL modem 50 is also connected to a telephone line 70 that supports xDSL services. This telephone line (along with other similar telephone lines 71, 72, etc.) is typically connected to a DSL Access Multiplexer (DSLAM) 80, which is connected via, e.g., a DS-3 communications line 81, to a telecommunications managed facility 90 that has connectivity to an Internet backbone 100, e.g., UUNET. As is evident from FIG. 1, router 40 is a critical link between LANs 10 and 20 and the Internet. Keeping this component of the network in an operative state is therefore especially desirable.

Experience by the present inventor has shown that some router models, are configured in such a way that when the router experiences a period of inactivity it has a tendency to lock up and, for all intents and purposes, become inoperative. When the router shuts down in this fashion, the quickest (and usually only) way to bring the router back on line is to cycle its power, i.e., unplug its power source and then reapply power. Unfortunately, during the ensuing router down time, the user has no access to the Internet. Router inactivity can be caused by a failure of a user's xDSL service, for example, or can be caused by inactivity from the LAN side of the network, e.g., when LANs 10 and 20 are not being used, e.g., at times outside of normal business hours.

Figure 2:
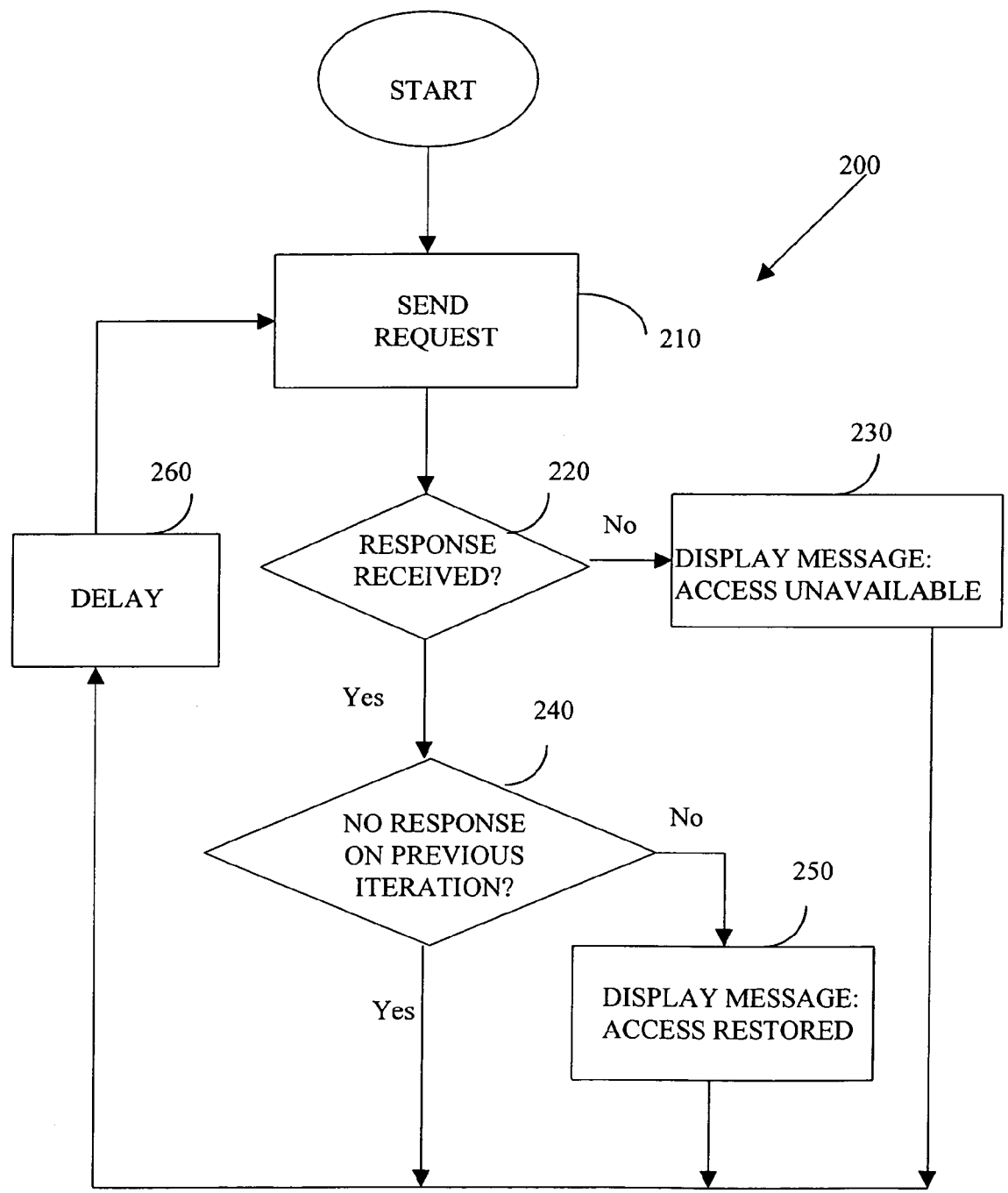
FIG. 2 is a flowchart illustrating a preferred embodiment of the present invention.

The present invention keeps router 40 from falling into a lock-up state by periodically and automatically (i.e., without user intervention) accessing router 40. FIG. 2 is a flow chart illustrating this process. Specifically, at step 210 a request is sent via router 40. The request is one that, under normal circumstances, should receive a response. A preferred type of request is the well-known "ping" command which "bounces" a signal off of a predetermined Internet protocol (IP) address. The predetermined IP address, or destination, responds if it is on-line. Alternatively, a browser could be employed to access a predetermined web site and record whether the web site had indeed been properly accessed.

At step 220 it is determined whether a response to the request has been received. If no response is received, then at step 230 a message is displayed for the user, e.g., in the form of a pop-up window, notifying the user that his Internet access is temporarily unavailable. That is, since a response to the request was not received it is assumed that the request failed to communicate with the predetermined IP address. Nevertheless, traffic was still passed to router 40 thereby keeping it in an active state. The process then proceeds to step 260, described below.

In an alternative embodiment, if no response is received, then a second IP address is "pinged." This secondary or backup IP address provides assurance that it is indeed the Internet connection that is down, and not just the first or primary IP address that is off-line or is not responding.

If a response was received at step 220, then at step 240 it is determined whether the last time a request was sent a response was not received. If a response had not been received, i.e., Internet access was unavailable, then at step 250 a pop-up window, for example, notifies the user that his Internet access has been restored. The process then proceeds to step 260, described below.

If at step 240, the last time a request was sent a response was received, then the process proceeds to step 260, which provides a time delay of a predetermined length. The process, beginning at step 210, then repeats. The time delay of step 260 is preferably less than the period of time that causes router 40 to fall into a state of lock-up, e.g., in the range of 5–10 minutes. Therefore, in accordance with the present invention, router 40 does not experience a period of inactivity that is sufficient to cause it to fall into a state of lock-up. Thus, even if users are not themselves accessing the Internet, or their xDSL service fails such that network traffic is also not passing from the Internet toward router 40, router 40 in accordance with the present invention, will still continue to be active within the network, thereby avoiding the lock-up issues associated with certain models of routers.

In a preferred embodiment of the present invention, the process illustrated in FIG. 2 is implemented in software using well-known high level languages such a C, C++, or Visual Basic, and stored on at least one computer 30 connected to at least one of LANs 10 and 20. FIG. 1 shows element 200 as representing the process of FIG. 2. The process can be stored on a computer's hard drive or within a firmware package. A combination of these storage methods can also be implemented depending on the design and configuration of the computer 30.

In a preferred implementation, the software that implements the process of FIG. 2 is downloaded via the Internet, thereby avoiding having to distribute the software by floppy disks or CD ROMs. By employing the downloading implementation, the IP address(es) used in the ping command can be easily changed by requesting the user, e.g., by email, to download a newer or upgraded version of the software.

Preferably, the software that implements the method of the present invention is loaded on one or more PCs 30 in such a way that when the PC is first booted, the software is automatically launched and thereafter performs its iterative process until the PC is subsequently shut down. Such techniques are well-known to those skilled in the art.

While the present invention has been described in connection with routers and xDSL service, the present invention is applicable to any network component that may benefit from periodic network traffic.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of maintaining activity in a router to keep the router from entering a lock-up state, comprising the steps of:
   (a) automatically sending a request from a user computer that is connected to a wide area network by the router which is connected to a modem, the request being sent via the router and the modem toward a first Internet Protocol (IP) address of a backbone of the wide area network to which a response is expected such that the request is sent through and beyond the router and the modem;
   (b) determining, in the user computer, whether the response has been received from the first IP address of the backbone of the wide area network and when the response has not been received from the first IP address, then automatically sending a request from the user computer via the router and modem toward a second IP address of the backbone of the wide area network and determining, in the user computer, whether the response has been received from the second IP address of the backbone of the wide area network;

(c) if no response has been received from the first IP address or the second IP address, displaying a notification message on the user computer indicating that network access to the wide area network is unavailable; and (d) periodically repeating at least steps (a) and (b).

2. The method of claim 1, wherein the request comprises a ping command.

3. The method of claim 2, wherein an Internet Protocol (IP) address is used as a destination address for the ping command.

4. The method of claim 1, wherein the step of displaying a notification message comprises a pop-up window.

5. The method of claim 1, wherein the method is implemented with one of computer software, firmware, or a combination thereof.

6. The method of claim 5, wherein the software is downloaded from the Internet.

7. The method of claim 1, further comprising the step of determining if on an immediately preceding iteration no response was received once it has been determined that a response is received in a current iteration and, if so, displaying a notification message indicating that network access has been restored.

8. The method of claim 1, wherein the network is the Internet.

9. In a network having a plurality of user computers in communication with a router, the router being in communication with a Digital Subscriber Line (DSL), the DSL carrying data to and from at least one of the plurality of user computers over the Internet and carrying voice signals to and from a telephone, a method of keeping the router in an operable state, comprising the steps of (a) periodically and automatically sending from at least one of the user computers towards a first network address of a DSL Access Multiplexer (DSLAM) a request to which a response is expected, the request being sent through the router that is located in a path of communication between the at least one of the user computers and the DSLAM;

(b) determining if the response is received and if not response then automatically sending from the at least one of the user computers towards a second network address of the DSLAM a request to which a response is expected, the request to the second network address being sent through the router that is located in the patch of communication between the at least one of the user computers and the DSLAM;

(c) displaying a first notification message on the at least one user computer when no response is received from either the first network address or the second network address; and (d) displaying a second notification message on the at least one user computer when the response from either the first or the second network address is received.

10. The method of claim 9, wherein the request is sent every 5–10 minutes.

11. The method of claim 9, wherein the request to the first and second network addresses comprises a ping command.

12. The method of claim 11, wherein Internet Protocol (IP) addresses are used as the first and second network addresses for the ping command.

13. The method of claim 9, wherein the step of displaying a notification message comprises a pop-up window.

14. The method of claim 9, wherein the method is implemented with one of computer software, firmware, or a combination thereof.

15. The method of claim 14, wherein the computer software is operable within a multi-tasking computer operating system.

16. The method of claim 14, wherein the computer software, firmware or combination thereof is automatically launched when the computer is booted.

17. The method of claim 14, wherein the software is downloaded from the Internet.

18. A method of notifying an end user of the status of his Internet access, comprising the steps of:

(a) automatically pinging an Internet Protocol (IP) address of a wide area network from a computer belonging to the end user and connected to a local area network which is in turn connected to a router which is in turn connected to a modem which is in turn connected to the wide area network such that the ping travels through the router and the modem to the wide area network;

(b) determining if a response to the pinging is received at the computer from the wide area network via the modem and router and automatically singing a second IP address of the wide area network from the computer belonging to the end user; and (c) displaying a first message indicating that the user's Internet access is unavailable if no response from either the IP address or the second IP address is received, and displaying a second message indicating that the user's Internet access is restored when a response is received from either the IP address or the second IP address, after not receiving a response to a previous pinging.

19. The method of claim 18, wherein steps (a)–(c) are automatically repeated.

20. The method of claim 19, wherein repeated pinging keeps the router from entering a lock-up state.

21. The method of claim 18, wherein the method is implemented in one of software, firmware, or a combination thereof.

22. The method of claim 21, wherein the software is downloaded from the Internet.

23. The method of claim 21, wherein the computer software, firmware or a combination thereof is automatically launched when the computer is booted.

24. The method of claim 18, wherein the computer software is operable within a multi-tasking computer operating system.

25. In a network having a plurality of end user computers in communication with a router, the router being in communication with a Digital Subscriber Line (DSL), the DSL carrying data to and from at least one of the plurality of end user computers over the Internet and carrying voice signals to and from a telephone, a system for keeping the router in an operable state, comprising:

(a) means for periodically and automatically sending from at least one of the end user computers towards a first network address of a DSL Access Multiplexer (DSLAM) a request to which a response is expected, the request being sent through the router that is located in a path of communication between the at least one of the user computers and the DSLAM;

(b) means for determining if the response is received and for automatically sending from the at least one of the end user computers towards a second network address of the DSLAM a request to which a response is expected, the request being sent through the router that is located in the path of communication between the at least one of the user computers and the DSLAM;

(c) means for displaying a first notification message on the at least one end user computer when no response is received from either the first or second network addresses; and (d) means for displaying a second notification message on the at least one end user computer when the response is received from either of the first or second network addresses.

26. The system of claim 25, wherein the request is sent every 5–10 minutes.

27. The system of claim 25, wherein the request to the first and second network addresses comprises a ping command.

28. The system of claim 27, wherein Internet Protocol (IP) addresses are used as the first and second network addresses for the ping command.

29. The system of claim 25, wherein the notification message is in the form of a pop-up window.

30. The system of claim 25, wherein the means for elements (a)–(d) comprises one of computer software, firmware, or a combination thereof.

31. The system of claim 30, wherein the computer software, firmware or the combination thereof is operable within a multi-tasking computer operating system.

32. The system of claim 30, wherein the computer software, firmware or combination thereof is automatically launched when the computer is booted.

* * * * *